(12) United States Patent
Kim et al.

(10) Patent No.: US 8,879,238 B2
(45) Date of Patent: Nov. 4, 2014

(54) MULTILAYER CERAMIC CAPACITOR AND METHOD OF MANUFACTURING THE SAME

(71) Applicant: Samsung Electro-Mechanics Co., Ltd., Gyunggi-do (KR)

(72) Inventors: Eung Soo Kim, Gyunggi-do (KR); Jong Ho Lee, Gyunggi-do (KR); Jae Yeol Choi, Gyunggi-do (KR); Doo Young Kim, Gyunggi-do (KR); Yu Na Kim, Gyunggi-do (KR); Sung Woo Kim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 113 days.

(21) Appl. No.: 13/738,491

(22) Filed: Jan. 10, 2013

(65) Prior Publication Data

US 2014/0160617 A1 Jun. 12, 2014

(30) Foreign Application Priority Data

Dec. 11, 2012 (KR) ........................ 10-2012-0143468

(51) Int. Cl.
*H01G 4/06* (2006.01)
*H01G 4/01* (2006.01)
*H01G 4/00* (2006.01)

(52) U.S. Cl.
CPC ... *H01G 4/01* (2013.01); *H01G 4/00* (2013.01)
USPC .................. 361/321.2; 361/306.1; 361/306.3; 361/301.2; 361/301.4; 361/321.1

(58) Field of Classification Search
USPC ................ 361/321.2, 301.2, 301.4, 303–305, 361/306.1, 306.3, 311–313, 321.1
See application file for complete search history.

(56) References Cited

U.S. PATENT DOCUMENTS

| 7,612,983 | B2 * | 11/2009 | Maegawa et al. | 361/309 |
| 7,646,585 | B2 * | 1/2010 | Aoki | 361/306.1 |
| 8,373,964 | B2 * | 2/2013 | Ahn et al. | 361/301.4 |
| 8,456,799 | B2 * | 6/2013 | Chang et al. | 361/321.2 |
| 8,570,710 | B2 * | 10/2013 | Kim et al. | 361/321.2 |
| 8,649,155 | B2 * | 2/2014 | Sasaki | 361/303 |
| 8,687,345 | B2 * | 4/2014 | Higashi et al. | 361/306.3 |

FOREIGN PATENT DOCUMENTS

| JP | 63115206 U | 7/1988 |
| JP | 63193801 U | 12/1988 |
| JP | 01-186607 | 7/1989 |
| JP | 10-289837 A | 10/1998 |
| JP | 11340085 A | 12/1999 |
| JP | 200225850 A | 1/2002 |
| JP | 2003-007566 A | 1/2003 |

(Continued)

OTHER PUBLICATIONS

Japanese Office Action issued in Japanese Application No. 2013-002403 dated Mar. 25, 2014, w/English translation.

(Continued)

*Primary Examiner* — Nguyen T Ha
(74) *Attorney, Agent, or Firm* — McDermott Will & Emery LLP (57) ABSTRACT

There is provided a multilayer ceramic capacitor, and a method of manufacturing the same, the multilayer ceramic capacitor including: a ceramic body; a first internal electrode; a second internal electrode; a first external electrode; a second external electrode; and an insulating layer.

24 Claims, 9 Drawing Sheets

(56) References Cited

FOREIGN PATENT DOCUMENTS

| | | |
|---|---|---|
| JP | 2008-258481 A | 10/2008 |
| JP | 2009-026872 A | 2/2009 |
| JP | 2009-054973 A | 3/2009 |

OTHER PUBLICATIONS

Notice of Office Action Japanese Patent Application No. 2013-002403 dated Oct. 22, 2013 with English language translation.

* cited by examiner

MULTILAYER CERAMIC CAPACITOR AND METHOD OF MANUFACTURING THE SAME

CROSS-REFERENCE TO RELATED APPLICATIONS

This application claims the priority of Korean Patent Application No. 10-2012-0143468 filed on Dec. 11, 2012, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same.

2. Description of the Related Art

In general, electronic components using a ceramic material, such as a capacitor, an inductor, a piezoelectric element, a varistor, a thermistor, or the like, include a ceramic body formed of a ceramic material, internal electrodes formed within the ceramic body, and external electrodes mounted on a surface of the ceramic body so as to be connected to the internal electrodes.

Among ceramic electronic components, a multilayer ceramic capacitor includes a plurality of stacked dielectric layers, internal electrodes disposed to face each other, having the dielectric layer interposed therebetween, and external electrodes electrically connected to the internal electrodes.

Multilayer ceramic capacitors have been widely used as components in mobile communications devices such as computers, personal digital assistants (PDA), mobile phones, and the like, due to inherent advantages thereof such as a small size, high capacitance, mountability, and the like.

Recently, as electronic products have been miniaturized and multi-functionalized, chip components have also tended to be miniaturized and multi-functionalized. Therefore, a small sized multilayer ceramic capacitor having high capacitance has been demanded.

In addition, the multilayer ceramic capacitor has been usefully used as a bypass capacitor disposed within a power supply circuit in a large scale integration (LSI) scheme. The multilayer ceramic capacity needs to have capability to effectively remove high frequency noise in order to serve as the bypass capacitor. This demand has been further increased in accordance with the trend for electronic devices having high frequencies. The multilayer ceramic capacitor used as the bypass capacitor may be electrically connected to a mounting pad on a circuit board through soldering, and the mounting pad may be connected to other external circuits through wiring patterns or conductive vias on the circuit board.

The multilayer ceramic capacitor has equivalent series resistance (ESR) and equivalent series inductance (ESL) components in addition to a capacitance component. These ESR and ESL components may hinder a function of the bypass capacitor. Particularly, the ESL increases inductance of the capacitor at a high frequency to thereby hinder high frequency noise removal characteristics.

RELATED ART DOCUMENT (Patent Document 1) Japanese Patent Laid-open Publication No. 1998-289837

SUMMARY OF THE INVENTION

An aspect of the present invention provides a multilayer ceramic capacitor having excellent capacitance and an excellent mounting density, and a method of manufacturing the same.

According to an aspect of the present invention, there is provided a multilayer ceramic capacitor including: a ceramic body including a dielectric layer and having first and second main surfaces opposing each other, first and second side surfaces opposing each other, and first and second end surfaces opposing each other; a first internal electrode having a first pattern part exposed to all of the side surfaces and the end surfaces of the ceramic body and first non-pattern parts formed at a first corner portion of the ceramic body and a third corner portion thereof disposed at an opposite side to the first corner portion in a width direction; a second internal electrode disposed to face the first internal electrode with the dielectric layer interposed therebetween, and having a second pattern part exposed to all of the side surfaces and the end surfaces of the ceramic body and second non-pattern parts formed at second and fourth corner portions disposed at an opposite side to the first and third corner portions in a length direction; a first external electrode formed in a region in which the first pattern part and the second non-pattern part are overlapped with each other on the first side surface, to be electrically connected to the first pattern part and extended from the first side surface to at least one of the first and second main surfaces and the second side surface; a second external electrode formed in a region in which the second pattern part and the first non-pattern part are overlapped with each other on the first side surface, to be electrically connected to the second pattern part and extended from the first side surface to at least one of the first and second main surfaces and the second side surface; and an insulating layer formed to enclose all of the first and second side surfaces, the first and second end surfaces, and the first and second external electrodes formed on the first and second side surfaces.

When a total length of the first and second internal electrodes is A, and a length of the first and second non-pattern parts is a, the following equation may be satisfied: $0.05 \leq a/A \leq 0.4$.

The first and second external electrodes may be formed as bands, and when a width of the first and second external electrodes formed as bands on the first and second side surfaces is BW, and a length of the first and second non-pattern parts is a, the following equation may be satisfied: $BW < a$.

The first and second external electrodes may be extended from the first side surface to one surface of the first and second main surfaces.

The first and second external electrodes may be extended from the first side surface to the first and second main surfaces.

The first and second external electrodes may be extended from the first side surface to one surface of the first and second main surfaces, and the second side surface.

The first and second external electrodes may be extended from the first side surface to the first and second main surfaces and the second side surface and have a square "□" shape.

The insulating layer may include an organic resin, ceramic, an inorganic filler, glass, or a mixture thereof.

The first and second internal electrodes may be disposed horizontally with respect to a mounting surface of the ceramic body.

The ceramic body may have a length larger than a width.

According to another aspect of the present invention, there is provided a multilayer ceramic capacitor including: a ceramic body including a dielectric layer and having first and second main surfaces opposing each other, first and second side surfaces opposing each other, and first and second end surfaces opposing each other; a first internal electrode having a first pattern part exposed to all of the side surfaces and the end surfaces of the ceramic body and a first non-pattern part formed at a first corner portion of the ceramic body; a second internal electrode disposed to face the first internal electrode with the dielectric layer interposed therebetween, and having a second pattern part exposed to all of the side surfaces and the end surfaces of the ceramic body and a second non-pattern part formed at a second corner portion disposed at an opposite side to the first corner portion in a length direction; a first external electrode electrically connected to the first internal electrode while not being electrically connected to the second internal electrode; a second external electrode electrically connected to the second internal electrode while not being electrically connected to the first internal electrode; and an insulating layer formed to enclose all of the first and second side surfaces, the first and second end surfaces, and the first and second external electrodes formed on the first and second side surfaces.

According to another aspect of the present invention, there is provided a method of manufacturing a multilayer ceramic capacitor, the method including: preparing a plurality of first and second ceramic green sheets; forming a first internal electrode on the first ceramic green sheet; forming a second internal electrode on the second ceramic green sheet; alternately stacking the first and second ceramic green sheets and firing the stacked ceramic green sheets to manufacture a ceramic body having first and second main surfaces opposing each other, first and second side surfaces opposing each other, and first and second end surfaces opposing each other; forming first and second external electrodes electrically connected to the first and second internal electrodes, respectively; and forming an insulating layer to enclose the first and second side surfaces, the first and second end surfaces, and the first and second external electrodes formed on the first and second side surfaces, wherein the first internal electrode has a first pattern part exposed to all of the side and end surfaces of the ceramic body and first non-pattern parts formed on a first corner portion and a third corner portion disposed at an opposite side to the first corner portion in a width direction, and the second internal electrode is disposed to face the first internal electrode and has a second pattern part exposed to all of the side and end surfaces of the ceramic body and non-pattern parts formed at second and fourth corner portions disposed at an opposite side to the first and third corner portions in a length direction.

The forming of the insulating layer may be performed by a biscuit margin punching (BMP) process.

When a total length of the first and second internal electrodes is A, and a length of the first and second non-pattern parts is a, the following equation may be satisfied: $0.05 \leq a/A \leq 0.4$.

The first and second external electrodes may be formed as bands, and when a width of the first and second external electrodes formed as bands on the first and second side surfaces is BW, and a length of the first and second non-pattern parts is a, the following equation may be satisfied: $BW < a$.

The first and second external electrodes may be extended from the first side surface to one surface of the first and second main surfaces.

The first and second external electrodes may be extended from the first side surface to the first and second main surfaces.

The first and second external electrodes may be extended from the first side surface to one surface of the first and second main surfaces, and the second side surface.

The first and second external electrodes may be extended from the first side surface to the first and second main surfaces and the second side surface and have a square "☐" shape.

The insulating layer may include an organic resin, ceramic, an inorganic filler, glass, or a mixture thereof.

The first and second internal electrodes may be disposed horizontally with respect to a mounting surface of the ceramic body.

The ceramic body may have a length larger than a width.

BRIEF DESCRIPTION OF THE DRAWINGS

The above and other aspects, features and other advantages of the present invention will be more clearly understood from the following detailed description taken in conjunction with the accompanying drawings, in which:

FIGS. 7A and 713 show a method of manufacturing a multilayer ceramic capacitor according to an embodiment of the present invention, and FIGS. 70 and 7D are plane views of the multilayer ceramic capacitor manufactured by the method.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 1A:
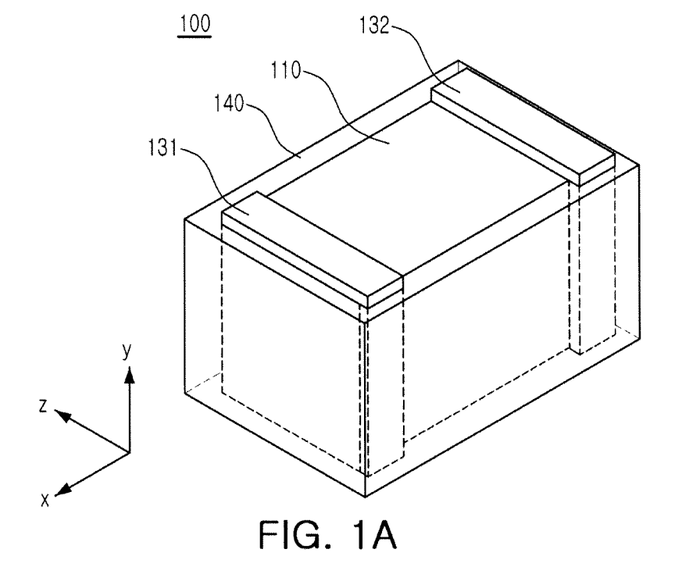
FIGS. 1A and 1B are perspective views respectively schematically showing a multilayer ceramic capacitor according to an embodiment of the present invention.
Figure 1B:
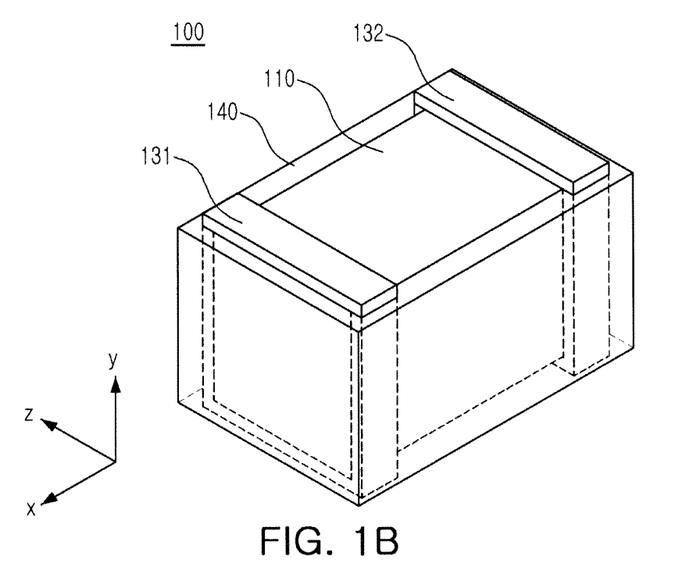
Figure 2:
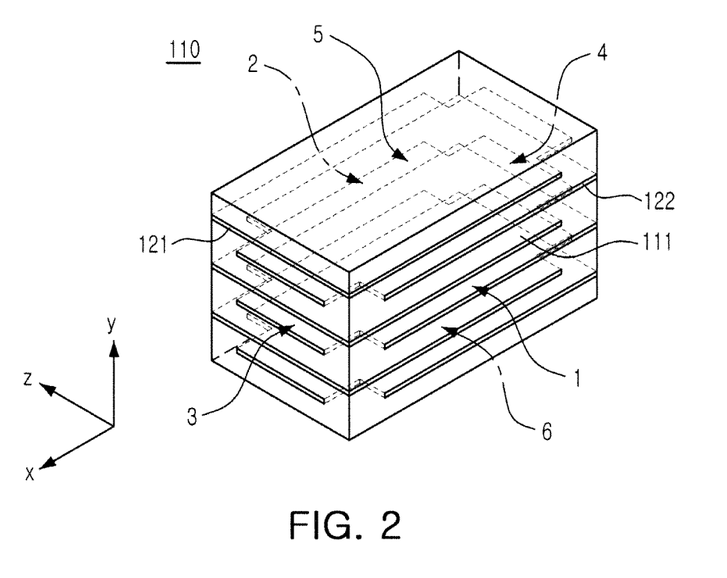
FIG. 2 is a perspective view schematically showing a ceramic body of the multilayer ceramic capacitor according to the embodiment of the present invention.
Figure 3:
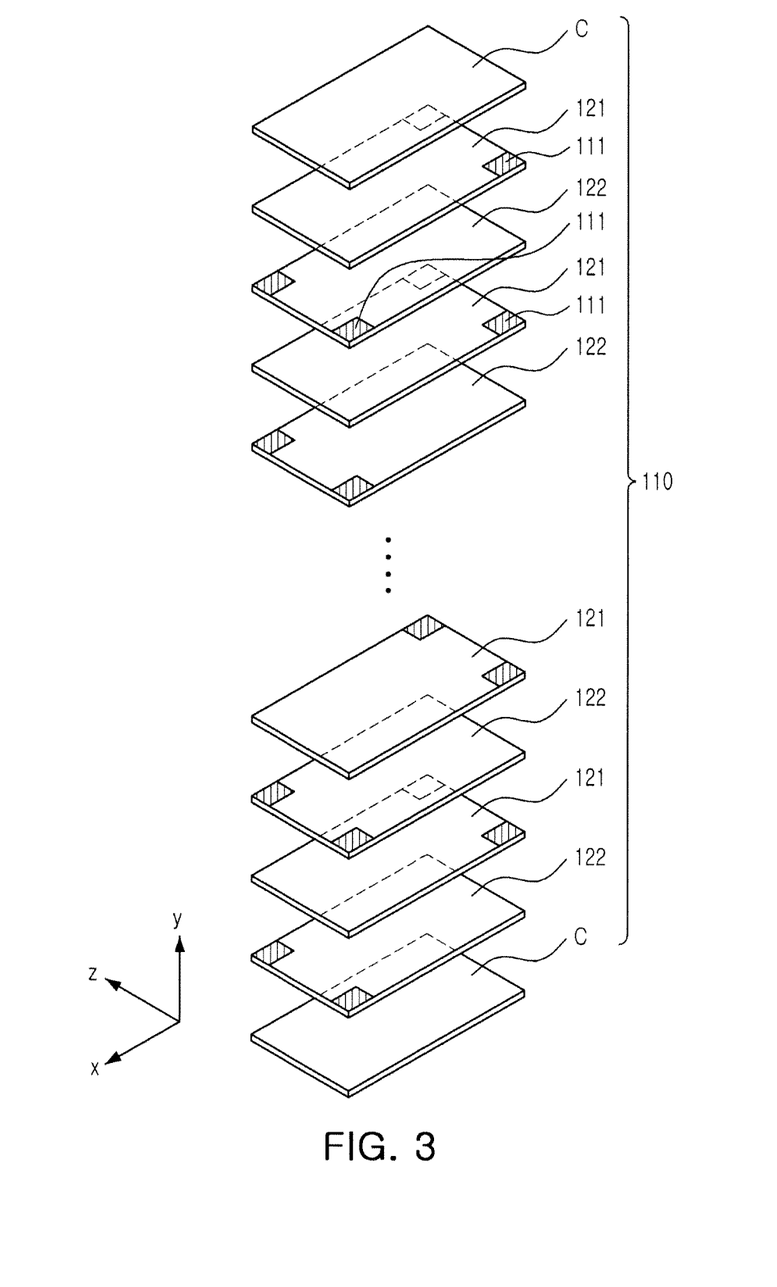
FIG. 3 is an exploded perspective view of the ceramic body of the multilayer ceramic capacitor according to the embodiment of the present invention.

FIGS. 1A and 1B are perspective views respectively schematically showing a multilayer ceramic capacitor according to an embodiment of the present invention; FIG. 2 is a perspective view schematically showing a ceramic body of the multilayer ceramic capacitor according to the embodiment of the present invention; and FIG. 3 is an exploded perspective view of the ceramic body of the multilayer ceramic capacitor according to the embodiment of the present invention.

Figure 4A:
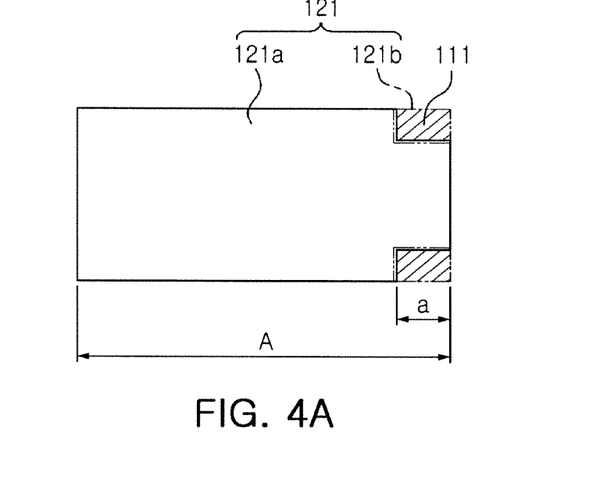
FIGS. 4A and 4B are plane views showing a structure of internal electrodes of the multilayer ceramic capacitor according to the embodiment of the present invention.
Figure 4B:
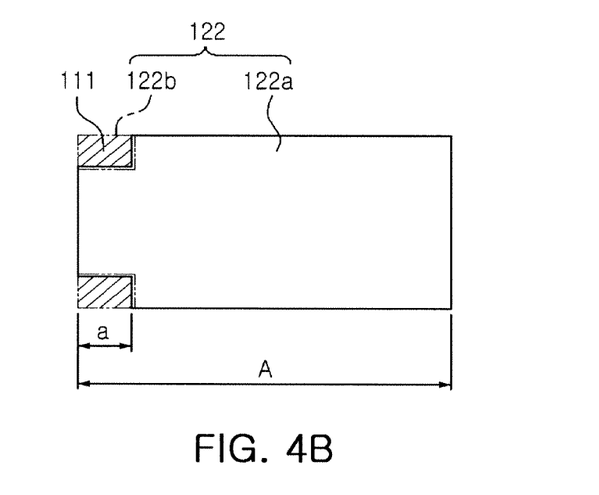

FIGS. 4A and 4B are plane views showing a structure of internal electrodes of the multilayer ceramic capacitor according to the embodiment of the present invention.

Figure 5A:
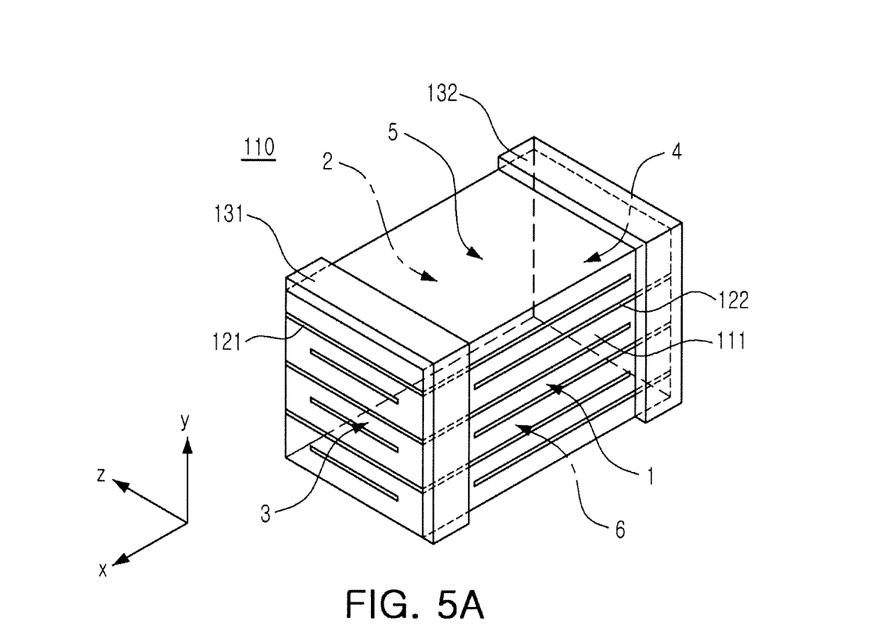
FIGS. 5A through 5D are perspective views showing the ceramic body and external electrodes of the multilayer ceramic capacitor according to the embodiment of the present invention.
Figure 5B:
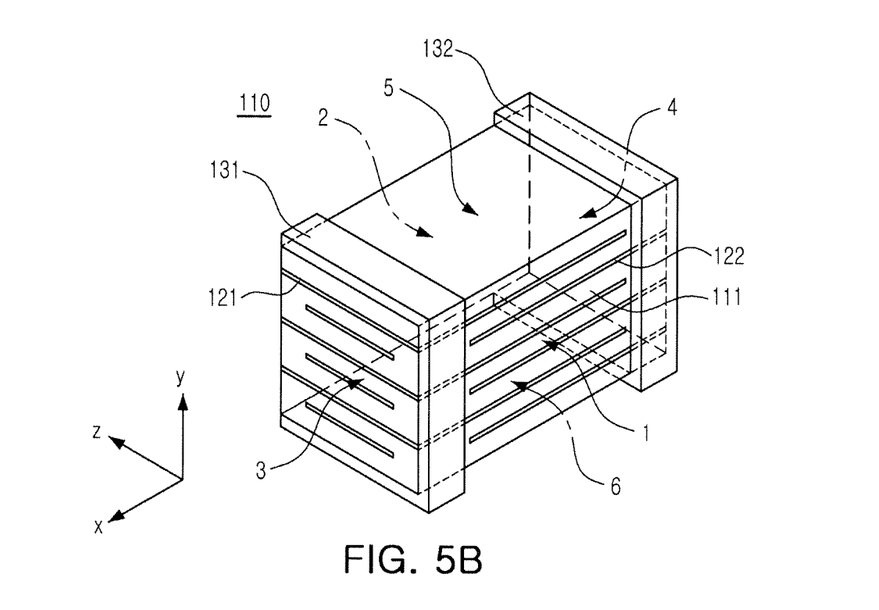
Figure 5C:
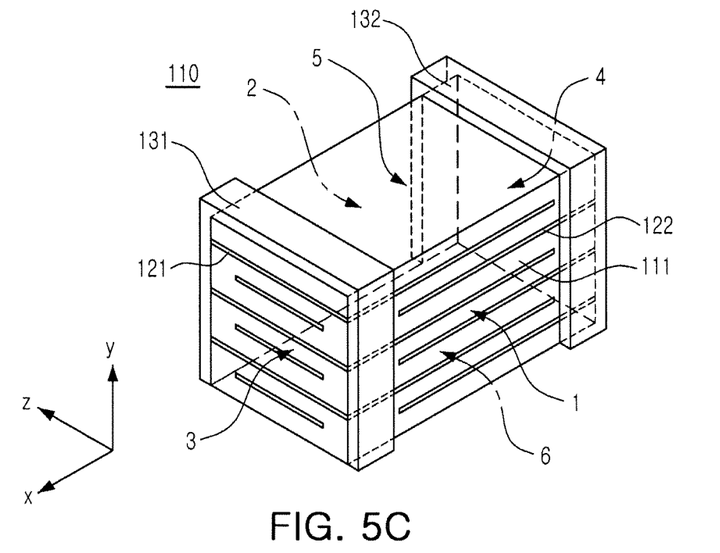
Figure 5D:
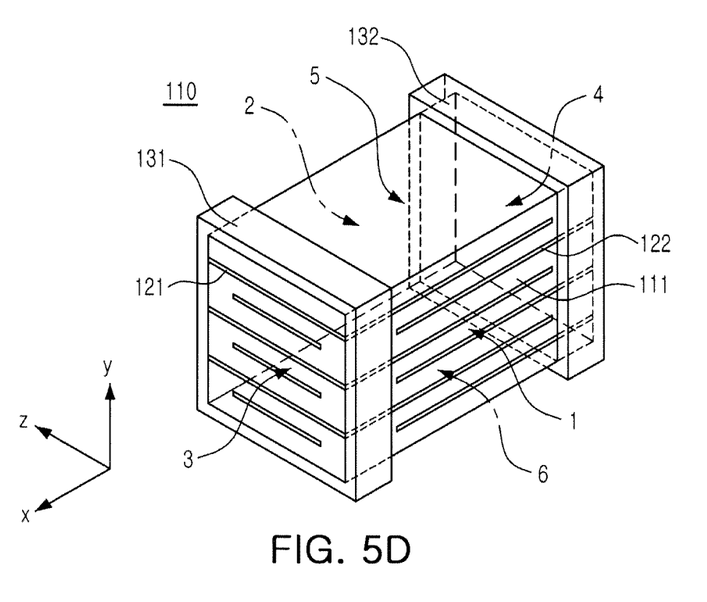
Figure 6A:
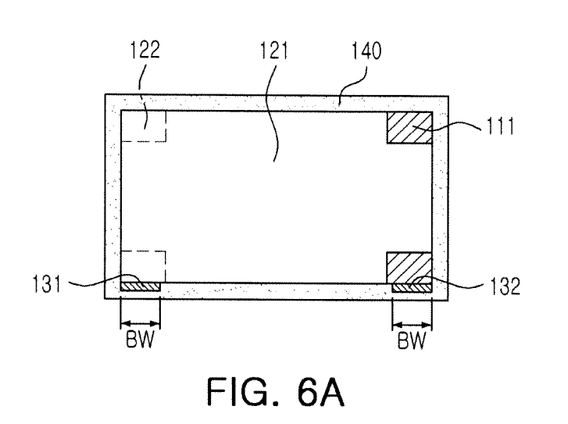
FIG. 6A is a cross-sectional view of FIG. 1A in an x-z direction.
Figure 6B:
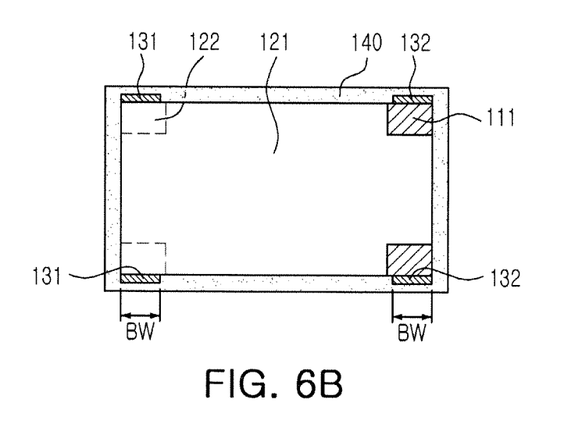
FIG. 6B is a cross-sectional view of FIG. 1B in the x-z direction.

FIGS. 5A through 5D are perspective views showing the ceramic body and external electrodes of the multilayer ceramic capacitor according to the embodiment of the present invention, FIG. 6A is a cross-sectional view of FIG. 1A in an x-z direction, and FIG. 6B is a cross-sectional view of FIG. 1B in the x-z direction.

Referring to FIGS. 1A and 1B, a multilayer ceramic capacitor 100 according to the embodiment of the present invention may include a ceramic body 110; first and second external electrodes 131 and 132; and an insulating layer 140.

Referring to FIG. 2, the ceramic body 110 may have first and second main surfaces 5 and 6 opposing each other, and first and second side surfaces 1 and 2 and first and second end surfaces 3 and 4 that connect the first and second main surfaces 5 and 6 to each other. A shape of the ceramic body 110 is not particularly limited, but may be a hexahedral shape as shown. Due to sintering shrinkage of ceramic powder when a chip is fired, the ceramic body 110 may not have a hexahedral shape with a complete straight line but have a substantial hexahedral shape.

The ceramic body 110 may include a plurality of dielectric layers 111 and the first and second internal electrodes 121 and 122 formed on the dielectric layers 111 as shown in FIG. 3, which is the exploded perspective view of FIG. 2, and may be formed by stacking the plurality of dielectric layers having the internal electrodes formed thereon. In addition, the first and second internal electrodes may be disposed to face each other in a y-direction, with each dielectric layer 111 interposed therebetween.

According to the embodiment of the present invention, the y-direction, a thickness direction of the ceramic body, refers to a direction in which the internal electrodes are stacked with one dielectric layer interposed therebetween, an x-direction refers to a length direction of the ceramic body, and a z-direction refers to a width direction of the ceramic body.

The ceramic body 110 may have a length larger than a width or a thickness.

According to the embodiment of the present invention, the plurality of dielectric layers 111 configuring the ceramic body 110 may be in a sintered state and may be integrated such that a boundary between adjacent dielectric layers may not be readily apparent.

The dielectric layers 111 may be formed by firing ceramic green sheets including ceramic powder, an organic solvent, and an organic binder. As the ceramic powder, which is a high k material, a barium titanate ($BaTiO_3$) based material, a strontium titanate ($SrTiO_3$) based material, or the like, may be used. However, the ceramic powder is not limited thereto.

According to the embodiment of the present invention, the first and second internal electrodes 121 and 122 may be disposed horizontally with respect to a mounting surface of the multilayer ceramic capacitor, that is, the first main surface 5.

In the present invention, the terms "first and second" may be used to describe members having different polarities.

According to the embodiment of the present invention, the first and second internal electrodes 121 and 122 may include a conductive metal, and the conductive metal may be nickel (Ni), copper (Cu), palladium (Pd), or an alloy thereof, but is not limited thereto.

Referring to FIGS. 4A and 4B, the first and second internal electrodes 121 and 122 include pattern parts 121a and 122a and non-pattern parts 121b and 122b, respectively. The pattern parts 121a and 122a denote regions in which a conductive pattern is formed on the dielectric layer, and the non-pattern parts 121b and 122b denote regions in which the conductive pattern is not formed on the dielectric layer.

Each of the first and second internal electrodes including the pattern parts and the non-pattern parts may be formed to have the same area as that of the dielectric layer.

In other words, in each internal electrode having the same area as that of the dielectric layer, a portion in which the conductive pattern is formed may be defined as the pattern part, and a portion other than the pattern part may be defined as the non-pattern part.

The first pattern part 121a may be formed to be exposed to the both side surfaces and the both end surfaces of the ceramic body, and the first non-pattern parts 121b may be formed at first and third corner portions of the ceramic body.

The second pattern part 122a may be formed to be exposed to the both side surfaces and the both end surfaces of the ceramic body, and the second non-pattern parts 122b may be formed at second and fourth corner portions of the ceramic body.

The term "corner portion" used in the present specification denotes a corner region at which two surfaces meet each other. Explaining the corner portion in a cross section of the ceramic body, the corner portion indicates a region in the vicinity of the angular point of a rectangle in an x-z cross section of the ceramic body according to the embodiment of the present invention.

Here, the second corner portion is formed at an opposite side to the first corner portion in the length direction, and the third and fourth corner portions are formed at opposite side to the first and second corner portions in the width direction, respectively.

As shown in FIGS. 4A and 4B, when a total length of the first and second internal electrodes 121 and 122 is A, and a length of the first and second non-pattern parts 121b and 122b is a, the multilayer ceramic electronic component according to the present invention may satisfy the following Equation: $0.05 \leq a/A \leq 0.4$. As described above, in the present invention, since the internal electrode 121 or 122 and the dielectric layer 111 have the same area, A may be a length of the dielectric layer 111 or the ceramic body 110.

Although described in more detail below, the first external electrode 131 may be formed in a region in which the first pattern part 121a and the second non-pattern part 122b are overlapped with each other on the first side surface, and the second external electrode 132 may be formed in a region in which the second pattern part 122a and the first non-pattern part 121b are overlapped with each other on the first side surface.

Therefore, in the case in which a/A is less than 0.05, a width of the non-pattern part is small, such that a contact defect between the internal electrode and the external electrode may be generated, or the external electrode may be formed in a region wider than the region in which the non-pattern part and the pattern part are overlapped with each other to cause electric conduction between the first and second internal electrodes. That is, possibilities of the contact defect between the internal electrode and the external electrode and short generations may be significantly increased.

Further, in the case in which a/A is greater than 0.4, capacitance may be reduced to be less than 80% of desired capacitance due to a lack of the overlapped area in the internal electrode, such that a capacitance defect may be generated.

Therefore, dimensions of the internal electrode need to satisfy the following Equation: $0.05 \leq a/A \leq 0.4$.

Referring to FIGS. 5A through 5D, the first and second external electrodes 131 and 132 may be formed to be connected to the first and second internal electrodes 121 and 122, respectively.

The first external electrode 131 may be formed in the region in which the first pattern part 121a and the second non-pattern part 122b are overlapped with each other on the first side surface, to be electrically connected to the first pattern part and extended from the first side surface to at least one of the first and second main surfaces and the second side surface, and the second external electrode 132 may be formed in the region in which the second pattern part 122a and the first non-pattern part 121b are overlapped with each other on the first side surface, to be electrically connected to the second pattern part and extended from the first side surface to at least one of the first and second main surfaces and the second side surface.

More specifically, the first and second external electrodes 131 and 132 may be extended from the first side surface to one surface of the first and second main surfaces (See FIG. 5A), to one surface of the first and second main surfaces and the second side surface (See FIG. 5C), or to the first and second main surfaces (See FIG. 5B).

The first and second external electrodes may be extended from the first side surface to the first and second main surfaces and the second side surface. In this case the first and second external electrodes may have a square "☐" shape (See FIG. 5D).

A shape in which the external electrode is extended as described above is not limited thereto, but may be appropriately changed. However, the external electrode should be necessarily extended to one of the first and second main surfaces of the ceramic body. As to be described below, since the insulating layer 140 is formed to entirely enclose the both side surfaces and both end surfaces 110 and the external electrodes 131 and 132 formed on the both side surfaces of the ceramic body, in the case in which the external electrode is not exposed to the main surface, it may be difficult to allow for conduction between the external electrode and the outside.

In addition, the first and second external electrodes 131 and 132 may be formed as bands and thus, respectively have a band shape.

FIG. 6A is a cross-sectional view of FIG. 1A in an x-z direction, and FIG. 6B is a cross-sectional view of FIG. 1B in the x-z direction.

Referring to FIGS. 6A and 6B, when a width of the first and second external electrodes formed as bands on the first and second side surfaces is BW, and a length of the first and second non-pattern parts 121b and 122b is a, the following equation, BW<a may be satisfied.

In the case in which BW is the same as or larger than a, the first and second internal electrodes may be electrically connected to each other.

In addition, although not shown, the external electrodes 131 and 132 are not necessarily formed to contact corners of the ceramic body 110, and may be spaced apart from the corners of the ceramic body.

The first and second external electrodes 131 and 132 may include a conductive metal, and the conductive metal may be nickel (Ni), copper (Cu), tin (Sn), or an alloy thereof, but is not limited thereto.

Meanwhile, according to the embodiment of the present invention, the insulating layer 140 may be formed to enclose all of the first and second end surfaces and the first and second side surfaces of the ceramic body 110 and the first and second external electrodes formed on the first and second side surfaces as shown in FIGS. 1A, 1B, 6A, and 6B.

Meanwhile, although not shown, the external electrodes 131 and 132 may be formed on the ceramic body 110 as shown in FIGS. 5B and 5C, and the insulating layer 140 may be formed to enclose all of the first and second side surfaces and the first and second end surfaces of the ceramic body 110 and the first and second external electrodes formed on the first and second surfaces.

The insulation layer 140 covers the first and second internal electrodes 121 and 122 exposed to the side surfaces and the end surfaces of the ceramic body, whereby a short-circuit between the internal electrodes may be prevented, and an internal defect such as deterioration in moisture resistance characteristics, or the like, may be prevented.

Since the insulating layer 140 encloses first and second external electrodes 131 and 132 formed on the both side surfaces, the first and second external electrodes need to be exposed to at least one of the first and second main surfaces, and the first or second main surface may be a mounting surface.

Therefore, the first and second internal electrodes 121 and 122 may be disposed horizontally with respect to the mounting surface of the ceramic body.

The insulating layer 140 is not limited, but may include an organic resin, ceramic, an inorganic filler, glass, or a mixture thereof.

According to the above-mentioned embodiment of the present invention, the area of the overlapping region in which the first and second internal electrodes are overlapped with each other may be significantly increased, such that high capacitance may be implemented. In addition, the insulating layer is formed on the ceramic body having no margin portion to serve as the margin portion, such that a thickness of a margin region may be easily controlled. Therefore, a size of the multilayer ceramic electronic component may be reduced.

Further, the external electrodes are formed on the same surface of the ceramic body, such that a mounting density may be improved.

According to another embodiment of the present invention, there is provided a multilayer ceramic capacitor including the ceramic body 110 including the dielectric layer 111 and having the first and second main surfaces 5 and 6 opposing each other, the first and second side surfaces 1 and 2 opposing each other, and the first and second end surfaces 3 and 4 opposing each other; the first internal electrode 121 having the first pattern part 121a exposed to all of the side and end surfaces of the ceramic body 110 and the first non-pattern part 121b formed at the first corner portion; the second internal electrode 122 disposed to face the first internal electrode 121 with the dielectric layer 111 interposed therebetween, and having the second pattern part 122a exposed to all of the side and end surfaces of the ceramic body 110 and the second non-pattern part 122b formed at the second corner portion disposed at an opposite side to the first corner portion in the length direction; the first external electrode 131 electrically connected to the first internal electrode 121 while not being electrically connected to the second internal electrode 122; the second external electrode 132 electrically connected to the second internal electrode 122 while not being electrically connected to the first internal electrode 121; and the insulating layer 140 formed to enclose the first and second side surfaces, the first and second end surfaces, and the first and second external electrodes formed on the first and second side surfaces.

According to another embodiment of the present invention, there is provided a method of manufacturing a multilayer ceramic capacitor, the method including: preparing a plurality of first and second ceramic green sheets; forming the first internal electrode 121 on the first ceramic green sheet; forming the second internal electrode 122 on the second ceramic green sheet; alternately stacking the first and second ceramic green sheets and firing the stacked ceramic green sheets to manufacture the ceramic body 110 having the first and second main surfaces 5 and 6 opposing each other, the first and second side surfaces 1 and 2 opposing each other, and the first and second end surfaces 3 and 4 opposing each other; forming the first and second external electrodes 131 and 132 electrically connected to the first and second internal electrodes 121 and 122, respectively; and forming the insulating layer 140 to enclose the first and second side surfaces, the first and second end surfaces and the first and second external electrodes formed on the first and second side surfaces, wherein the first internal electrode 121 has the first pattern part 121a exposed to all of the side and end surfaces of the ceramic body and the first non-pattern parts 121b formed at the first corner portion and the third corner portion disposed at an opposite side to the first corner portion in the width direction, and the second internal electrode 122 is disposed to face the first internal electrode 121 and has the second pattern part 122a exposed to all of the side and end surfaces of the ceramic body and the non-pattern parts 122b formed at the second and fourth corner portions disposed at opposite side to the first and third corner portions in the length direction.

A description overlapped with the description for the above-mentioned multilayer ceramic capacitor will be omitted, and hereinafter, the method of manufacturing a multilayer ceramic capacitor will be described in detail.

The forming of the first and second internal electrodes 121 and 122 may be performed by printing the internal electrodes using a conductive paste on the ceramic green sheets forming the dielectric layers by a printing method such as a screen printing method or a gravure printing method, but is not limited thereto.

Then, the plurality of first and second ceramic green sheets including the first and second internal electrodes formed thereon may be alternately stacked and pressed in a direction in which the ceramic sheets are stacked, and the stacked first and second ceramic sheets and the first and second internal electrodes formed thereon may be compressed with each other and fired.

Through the above-mentioned process, a stacked body in which the plurality of dielectric layers 111 and the plurality of first and second internal electrodes 121 and 122 are alternately stacked may be formed.

Next, the stacked body may be cut per a region corresponding to each multilayer ceramic capacitor to be formed in a chip shape, and the cut chip is plasticized and fired at a high temperature, followed by polishing the fired chip, thereby completing the ceramic body 110 having the first and second internal electrodes 121 and 122 therein.

Next, the first external electrode 131 formed in the region in which the first pattern part 121a and the second non-pattern part 122b are overlapped with each other on the first side surface to be electrically connected to the first pattern part 121a and extended to at least one of the first and second main surfaces and the second side surface, and the second external electrode 132 formed in the region in which the second pattern part 122a and the first non-pattern part 121b are overlapped with each other on the first side surface to be electrically connected to the second pattern part 122a and extended from the first side surface to at least one of the first and second main surfaces and the second side surface may be formed.

The first and second external electrodes 131 and 132 may be formed of a conductive paste including a conductive metal, but is not limited thereto.

The conductive metal may be nickel (Ni), copper (Cu), tin (Sn), or an alloy thereof, but is not limited thereto. The conductive paste may further include an insulating material. The insulating material may be, for example, glass, an organic resin, or the like, but is not limited thereto.

The method of forming the first and second external electrodes 131 and 132 is not particularly limited. That is, the first and second electrodes 131 and 132 may be formed by dipping the ceramic body or formed by various methods such as a plating method, a printing method, or the like.

Next, the insulating layer 140 may be formed to enclose all of the first and second side surfaces, the first and second end surfaces, and the first and second external electrodes formed on the first and second side surfaces.

The insulating layer 140 may be formed by applying a paste. Here, the paste may include an organic resin, ceramic, an inorganic filler, glass, or a mixture thereof, but is not limited thereto.

As a method of applying the paste, for example, there is a spray method or a method of using a roller, but the present invention is not limited thereto.

According to another embodiment of the present invention, the forming of the insulating layer 140 may be performed by a biscuit margin punching (BMP) process.

Figure 7A:
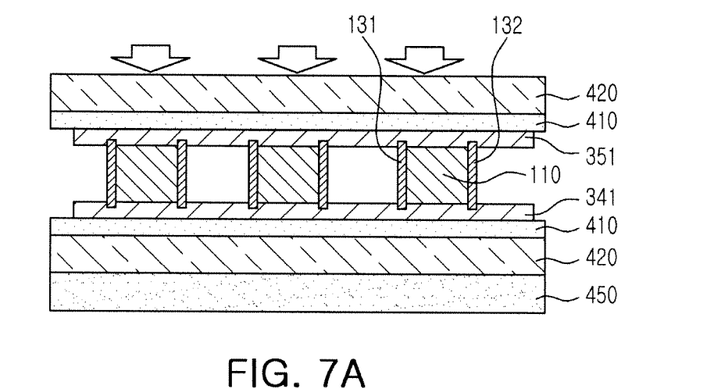
Figure 7B:
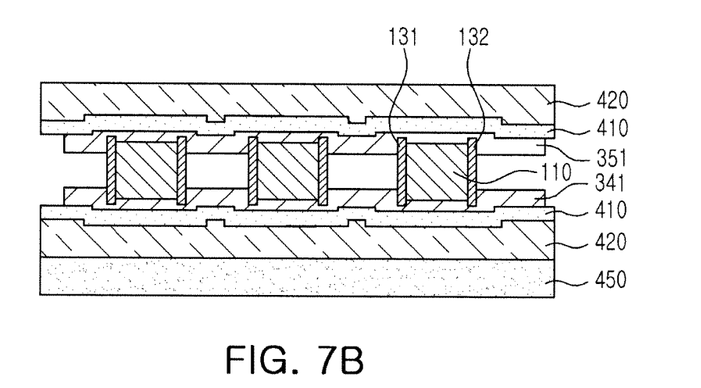

Hereinafter, the forming of the insulating layer by the biscuit margin punching (BMP) process will be described with reference to FIGS. 7A and 7B.

In order to apply the biscuit margin punching (BMP) process, the ceramic body 110 which has been pre-fired and having the external electrodes 131 and 132 formed thereon may be prepared. Since a description of configurations and shapes of the external electrode and the ceramic body is overlapped with the above-mentioned description, the description will be omitted.

The pre-fired ceramic body 110 as described above may be automatically aligned using magnetic force, or the like. In this case, a pre-firing range may be preferably limited to a firing shrinkage of 5 to 16% in order to impart strength having a predetermined level to the ceramic body 110.

Next, cover sheets 341 and 351 having a predetermined thickness and formed of the same material as than that of the dielectric layer included in the ceramic body or a material obtained by adding glass at a content ratio of 1 to 2.5 times higher or an additive such as magnesium (Mg) oxides or manganese (Mn) oxides, or the like, at a content ratio of 1 to 2.5 times higher than that of the dielectric layer are symmetrically attached to the first and second side surfaces 1 and 2 of the ceramic body 110, and the process may be performed on each of the cover sheets 341 and 351. Then, in order to prevent another member from being attached to the cover sheet, releasing films 410 are disposed thereon.

Further, after cushion members 420 formed of a material such as rubber, or the like, are disposed on the releasing films 410 and a supporting plate 450 formed of a metal such as aluminum, or the like, is disposed on the cushion member 420 disposed at the side of the first surface 1, primary compression is performed under a wide range of compression pressure, compression time, and compression temperature conditions, such that the cover sheets 341 and 351 may be attached to the first and second side surfaces 1 and 2 of the ceramic body 110 so as to have a uniform thickness.

In this case, when the compression pressure is excessively low, the cover sheets 341 and 351 may not be appropriately attached to the first and second side surfaces 1 and 2, while when the compression pressure is excessively high, the ceramic body 110 may be damaged.

According to the present invention, since the ceramic body 110 is partially shrunk by performing the pre-firing, it may be difficult to additionally shrink the ceramic body 110, such that crack generation according to formation of insulating layer 140 may be reduced.

Figure 7C:
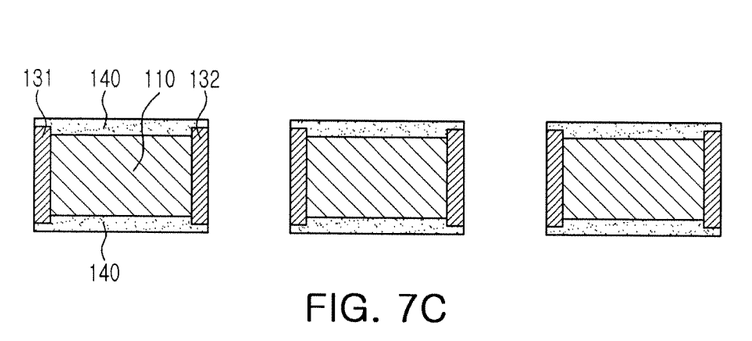
Figure 7D:
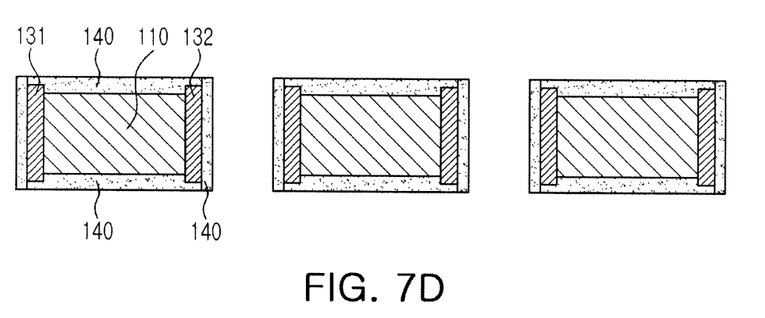

Thereafter, as shown in FIGS. 7C and 7D, when the cover sheets 341 and 351 are cut so as to correspond to a size of the ceramic body 110 and the above-mention processes are repeatedly performed on the first and second end surfaces of the ceramic body, the multilayer ceramic capacitor in which the insulating layer 140 is formed so as to enclose all of the first and second side surfaces and the first and second end surfaces of the ceramic body and the first and second external electrodes formed on the first and second side surfaces may be completed.

According to the embodiment of the present invention, it may be easy to apply an insulating material onto side surfaces of a ceramic body having a protrusion surface on which external electrodes are formed, and since the pre-firing is performed in advance and thus ceramic body 110 is partially shrunk, it may be difficult to additionally shrink the ceramic body 110, such that crack generation according to formation of insulating layer 140 may be reduced.

EXPERIMENTAL EXAMPLE

The following Table 1 shows data obtained by measuring a capacitance defect rate and an electrode defect rate of a multilayer ceramic capacitor according to the value of a/A while changing dimensions of an internal electrode, more specifically, a total length A of the internal electrode and a length of a non-pattern part.

More specifically, the case in which the capacitance is less than 80% of the desired capacitance was considered as the capacitance defect, and the both cases in which conduction between first and second internal electrodes is caused and conduction between internal and external electrodes is not performed were considered as the electrode defect. In addition, a decimal point was rounded up.

TABLE 1

| a/A | Capacitance defect rate | Electrode defect rate |
| --- | --- | --- |
| 0.01* | 0% | 49% |
| 0.03* | 0% | 27% |
| 0.04* | 0% | 17% |
| 0.05 | 1% | 6% |
| 0.10 | 2% | 5% |
| 0.20 | 2% | 5% |
| 0.30 | 3% | 4% |
| 0.35 | 5% | 3% |
| 0.39 | 5% | 1% |
| 0.40 | 6% | 1% |
| 0.41* | 11% | 1% |
| 0.43* | 13% | 3% |
| 0.45* | 13% | 1% |

*indicates a Comparative Example.

As shown in Table 1, it may be appreciated that when a/A is less than 0.05, the capacitance defect rate is low but the electrode defect rate is significantly high, while when a/A is more than 0.40, the electrode defect rate is low but the capacitance defect rate is high.

Therefore, it may be confirmed that a/A needs to be in a range of 0.05 to 0.4 as described above.

As set forth above, according to the embodiment of the present invention, the overlapping region of the first and second internal electrodes in which the first and second internal electrodes are overlapped with each other is increased, the overlapping region forming a capacitance part, whereby the capacitance of the multilayer ceramic capacitor can be increased.

In addition, with the multilayer ceramic capacitor according to the embodiment of the present invention, the external electrodes are formed on the same surface of the ceramic capacitor, whereby mounting density can be improved.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body including a dielectric layer and having first and second main surfaces opposing each other, first and second side surfaces opposing each other, and first and second end surfaces opposing each other;
   a first internal electrode having a first pattern part exposed to all of the side surfaces and the end surfaces of the ceramic body and first non-pattern parts formed at a first corner portion of the ceramic body and a third corner portion thereof disposed at an opposite side to the first corner portion in a width direction;
   a second internal electrode disposed to face the first internal electrode with the dielectric layer interposed therebetween, and having a second pattern part exposed to all of the side surfaces and the end surfaces of the ceramic body and second non-pattern parts formed at second and fourth corner portions disposed at an opposite side to the first and third corner portions in a length direction;
   a first external electrode formed in a region in which the first pattern part and the second non-pattern part are overlapped with each other on the first side surface, to be electrically connected to the first pattern part and extended from the first side surface to at least one of the first and second main surfaces and the second side surface;
   a second external electrode formed in a region in which the second pattern part and the first non-pattern part are overlapped with each other on the first side surface, to be electrically connected to the second pattern part and extended from the first side surface to at least one of the first and second main surfaces and the second side surface; and
   an insulating layer formed to enclose all of the first and second side surfaces, the first and second end surfaces, and the first and second external electrodes formed on the first and second side surfaces.

2. The multilayer ceramic capacitor of claim 1, wherein when a total length of the first and second internal electrodes is A, and a length of the first and second non-pattern parts is a, the following equation is satisfied: $0.05 \leq a/A \leq 0.4$.

3. The multilayer ceramic capacitor of claim 1, wherein the first and second external electrodes are formed as bands, and when a width of the first and second external electrodes formed as bands on the first and second side surfaces is BW, and a length of the first and second non-pattern parts is a, the following equation is satisfied: $BW < a$.

4. The multilayer ceramic capacitor of claim 1, wherein the first and second external electrodes are extended from the first side surface to one surface of the first and second main surfaces.

5. The multilayer ceramic capacitor of claim 1, wherein the first and second external electrodes are extended from the first side surface to the first and second main surfaces.

6. The multilayer ceramic capacitor of claim 1, wherein the first and second external electrodes are extended from the first side surface to one surface of the first and second main surfaces, and the second side surface.

7. The multilayer ceramic capacitor of claim 1, wherein the first and second external electrodes are extended from the first side surface to the first and second main surfaces and the second side surface.

8. The multilayer ceramic capacitor of claim 7, wherein the first and second external electrodes have a square "☐" shape.

9. The multilayer ceramic capacitor of claim 1, wherein the insulating layer includes an organic resin, ceramic, an inorganic filler, glass, or a mixture thereof.

10. The multilayer ceramic capacitor of claim 1, wherein the first and second internal electrodes are disposed horizontally with respect to amounting surface of the ceramic body.

11. The multilayer ceramic capacitor of claim 1, wherein the ceramic body has a length larger than a width.

12. A multilayer ceramic capacitor comprising:
a ceramic body including a dielectric layer and having first and second main surfaces opposing each other, first and second side surfaces opposing each other, and first and second end surfaces opposing each other;
a first internal electrode having a first pattern part exposed to all of the side surfaces and the end surfaces of the ceramic body and a first non-pattern part formed at a first corner portion of the ceramic body;
a second internal electrode disposed to face the first internal electrode with the dielectric layer interposed therebetween, and having a second pattern part exposed to all of the side surfaces and the end surfaces of the ceramic body and a second non-pattern part formed at a second corner portion disposed at an opposite side to the first corner portion in a length direction;
a first external electrode electrically connected to the first internal electrode while not being electrically connected to the second internal electrode;
a second external electrode electrically connected to the second internal electrode while not being electrically connected to the first internal electrode; and
an insulating layer formed to enclose all of the first and second side surfaces, the first and second end surfaces, and the first and second external electrodes formed on the first and second side surfaces.

13. A method of manufacturing a multilayer ceramic capacitor, the method comprising:
preparing a plurality of first and second ceramic green sheets;
forming a first internal electrode on the first ceramic green sheet;
forming a second internal electrode on the second ceramic green sheet;
alternately stacking the first and second ceramic green sheets and firing the stacked ceramic green sheets to manufacture a ceramic body having first and second main surfaces opposing each other, first and second side surfaces opposing each other, and first and second end surfaces opposing each other;
forming first and second external electrodes electrically connected to the first and second internal electrodes, respectively; and
forming an insulating layer to enclose the first and second side surfaces, the first and second end surfaces, and the first and second external electrodes formed on the first and second side surfaces,
wherein the first internal electrode has a first pattern part exposed to all of the side and end surfaces of the ceramic body and first non-pattern parts formed on a first corner portion and a third corner portion disposed at an opposite side to the first corner portion in a width direction, and the second internal electrode is disposed to face the first internal electrode and has a second pattern part exposed to all of the side and end surfaces of the ceramic body and non-pattern parts formed at second and fourth corner portions disposed at an opposite side to the first and third corner portions in a length direction.

14. The method of claim 13, wherein the forming of the insulating layer is performed by a biscuit margin punching (BMP) process.

15. The method of claim 13, wherein when a total length of the first and second internal electrodes is A, and a length of the first and second non-pattern parts is a, the following equation is satisfied: $0.05 \leq a/A \leq 0.4$.

16. The method of claim 13, wherein the first and second external electrodes are formed as bands, and when a width of the first and second external electrodes formed as bands on the first and second side surfaces is BW, and a length of the first and second non-pattern parts is a, the following equation is satisfied: $BW < a$.

17. The method of claim 13, wherein the first and second external electrodes are extended from the first side surface to one surface of the first and second main surfaces.

18. The method of claim 13, wherein the first and second external electrodes are extended from the first side surface to the first and second main surfaces.

19. The method of claim 13, wherein the first and second external electrodes are extended from the first side surface to one surface of the first and second main surfaces, and the second side surface.

20. The method of claim 13, wherein the first and second external electrodes are extended from the first side surface to the first and second main surfaces and the second side surface.

21. The method of claim 20, wherein the first and second external electrodes have a square "☐" shape.

22. The method of claim 13, wherein the insulating layer includes an organic resin, ceramic, an inorganic filler, glass, or a mixture thereof.

23. The method of claim 13, wherein the first and second internal electrodes are disposed horizontally with respect to a mounting surface of the ceramic body.

24. The method of claim 13, wherein the ceramic body has a length larger than a width.

* * * * *